US007002700B1

(12) United States Patent
Motamed (10) Patent No.: US 7,002,700 B1
(45) Date of Patent: Feb. 21, 2006

(54) METHOD AND SYSTEM FOR MERGING SCAN FILES INTO A COLOR WORKFLOW

(75) Inventor: Margaret Motamed, Foster City, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 1014 days.

(21) Appl. No.: 09/661,489

(22) Filed: Sep. 14, 2000

(51) Int. Cl.
G06F 15/00 (2006.01)
(52) U.S. Cl. .................. 358/1.1; 358/1.15; 358/1.18
(58) Field of Classification Search ............ 358/1.1, 358/1.5, 1.11, 1.12, 1.13, 1.14, 1.15, 1.18, 358/402, 407
See application file for complete search history.

(56) References Cited

U.S. PATENT DOCUMENTS

| | | | |
|---|---|---|---|
| 4,891,768 A | 1/1990 | Willems et al. | 364/518 |
| 5,133,494 A | 7/1992 | Wang et al. | 228/122 |
| 5,239,625 A | 8/1993 | Bogart et al. | 395/128 |
| 5,282,269 A | 1/1994 | Willems et al. | 395/164 |
| 5,732,230 A | 3/1998 | Cullen et al. | |
| 5,760,775 A | 6/1998 | Sklut et al. | 345/349 |
| 5,790,119 A | 8/1998 | Sklut et al. | 345/349 |
| 5,796,411 A | 8/1998 | Cyman et al. | 345/502 |
| 5,828,814 A | 10/1998 | Cyman et al. | 395/102 |
| 5,845,302 A | 12/1998 | Cyman, Jr. et al. | 707/517 |
| 5,872,569 A | 2/1999 | Salgado et al. | 345/349 |
| 5,911,044 A | 6/1999 | Lo et al. | |
| 6,092,088 A * | 7/2000 | Takeda | 715/500 |
| 6,094,276 A | 7/2000 | Yamaguchi et al. | |
| 6,453,127 B1 * | 9/2002 | Wood et al. | 399/8 |
| 6,509,974 B1 * | 1/2003 | Hansen | 358/1.12 |
| 6,549,302 B1 * | 4/2003 | Takeda et al. | 358/1.9 |

FOREIGN PATENT DOCUMENTS

| | | |
|---|---|---|
| EP | 0 218 287 A1 | 5/1987 |
| EP | 0 217 447 B1 | 7/1991 |
| EP | 0 217 448 B1 | 7/1991 |
| EP | 0 214 091 B1 | 7/1992 |
| EP | 0 346 388 B1 | 2/1993 |
| EP | 0 814 425 A2 | 12/1997 |
| EP | 0 837 401 A2 | 4/1998 |
| EP | 0 837 401 A3 | 4/1998 |
| EP | 0 858 041 A2 | 8/1998 |
| EP | 0 993 178 A2 | 4/1999 |
| EP | 0 814 425 A3 | 8/1999 |
| EP | 0 770 575 B1 | 5/2000 |

* cited by examiner

Primary Examiner—Mark Wallerson (57) ABSTRACT

A method and system for scanning documents in a network environment and merging the resulting scan files with other documents into a printing workflow provides a user interface in which the user merges a scan file and a document file on a page basis by selecting thumbnail images of the desired pages and dragging and dropping the thumbnails so that a new merged document results. An alternative embodiment allows the user to apply predefined merge templates to the selected pages. The predefined merge templates may include printing and formatting instructions such as color settings and a page layout.

The system architecture provides a color print server and a client workstation in communication with the color print server. A scanning device, which may be a dedicated scanner or the platen of a copying machine is connected to the color print server or the client workstation. The scanning software, resident on either the color print server or the workstation allows the user to customize the scan and apply modifications to the image after scanning. Scanned images may be retrieved by email or over the World Wide Web. The color print server and the attached scanning device may also function as a color copier.

46 Claims, 12 Drawing Sheets

METHOD AND SYSTEM FOR MERGING SCAN FILES INTO A COLOR WORKFLOW

BACKGROUND OF THE INVENTION

1. Field of the Invention

The invention relates to document scanning in a network environment. More particularly, the invention relates to a simplified method and system for merging scan files into a color workflow wherein the scan files are merged with document files on a page basis and job properties applied to the resulting merged document.

2. Description of Prior Art

In print shop environments, it is often necessary to combine electronic images created by scanning hard copy documents with an existing document file to produce a new document consisting of the images interspersed with the pages of the previous document in a desired order. For example, in the production of an illustrated calendar, photographs may be scanned to produce the calendar illustrations. The scans are then interleaved with the calendar pages, which may have been produced in a page layout program or a word processor. Subsequently, additional layout may be specified such as imposition or single-sided vs. duplex printing. Additional job options are specified, such as resolution, color profile and print profile and the document is output to a color printer. Thus, the production of such a document is a highly repetitious and time-consuming operation, and it requires a complex, multi-step workflow. Since print shops are production-type environments, there is an ongoing interest in increasing efficiency without sacrificing quality.

Various hardware components for accelerating the printing process are reported in the art. For example, T. Willems, and F. Tunissen, *Raster Image Processor*, U.S. Pat. No. 4,891,768 (Jan. 2, 1990) and T. Willems, and F. Tunissen, *Front-end System*, European Patent Application No. 0218287 (Sep. 27, 1985) both disclose hardware configurations that utitlize a raster image bus to accelerate the processing of information so that a higher throughput is provided to the print device. J. Menendez, W. Caterisano, and J. Ball, *High Speed Image Processor Particularly Suited for Use in an Image Management System*, U.S. Pat. No. 5,113,494 (May 12, 1992) also describe an improved raster image processor capable of providing output to a printing device at higher speeds than previously possible. The improvement is achieved by performing various image processing operations in parallel that had previously been performed serially. The disclosed devices do enable higher throughput of data to a printing device, but they don't address the problem of simplifying and accelerating complicated printing workflows, or of automating repetitive operations.

W. Neale, *A new generation of COM recorder brings new applications and opportunities, International Journal of Micrographics and Optical Technology*, v.14:5 (1996) discloses methods for transferring scanned bitmap images and merged documents to microfilm. The disclosed methods do not address the need in the art for accelerating the workflow by providing simple intuitive methods of merging document files and specifying job options.

Consequently, there is a need in the art for merging document files of various formats into a single workflow. It would be a further advantage to provide a means of merging scan files with document files on a page basis so that a new, merged document results. It would be desirable to provide a graphical user interface that allowed a user to produce such merged documents in a simple, intuitive manner. It would be advantageous to provide a simple way of specifying merging instructions and other job options in the form of merge templates that can be created, saved and reused for future jobs.

It would be highly advantageous to implement such methods in a network scanning environment that allowed a user to specify multiple destinations and formats for a scan file. The capability of applying image modifications to scan files prior to merging would be highly desirable. Finally, a software application that allowed a scanner and a print device together to function as a copying machine would be desirable.

SUMMARY OF THE INVENTION

The invention provides a method and system for document scanning in a network environment. A graphical user interface allows scan files to be merged with other document files into a printing workflow. The user creates and applies a set of merging instructions by selecting desired pages from the files to be merged and dragging and dropping thumbnail images of the selected pages from a source document to a destination document so that a new, merged document is created. In another embodiment of the invention, merge templates having predefined merging instructions are selected and applied to the desired pages. The templates may be created by saving previously generated merging instructions. In other embodiments of the invention, scripted merge templates are created manually, or by means of a workflow application, and then applied to a set of selected pages.

The system architecture includes a color print server with an attached scanning device and a client workstation in communication with the color print server. In one embodiment of the invention, scanning software is run locally on the color print server, and may be accessed through a GUI. In other embodiments of the invention, the interface may be an LCD interface on the color print server. In still other embodiments of the invention, the color print server is embedded in a color printing device and may be accessed through the control panel of the printing device. In an alternate embodiment of the invention, the scanning software is run remotely from the client workstation. Scans are initiated at the color print server and the resulting files are stored in a mailbox carrying a numerical designator on a mass storage device connected to the print server. After scanning, the scan file may be retrieved and modified. In a further embodiment of the invention, a scanning device is connected to a client workstation. A user interface is provided that permits the scanner and a print engine attached to the color print server to be used together as a copying machine.

DETAILED DESCRIPTION

The invention provides a method for merging document files on a page basis. Pages are selected from two or more document files and the selected pages are combined into a new, merged document. The resulting document file may subsequently be viewed, archived or printed.

Figure 1:
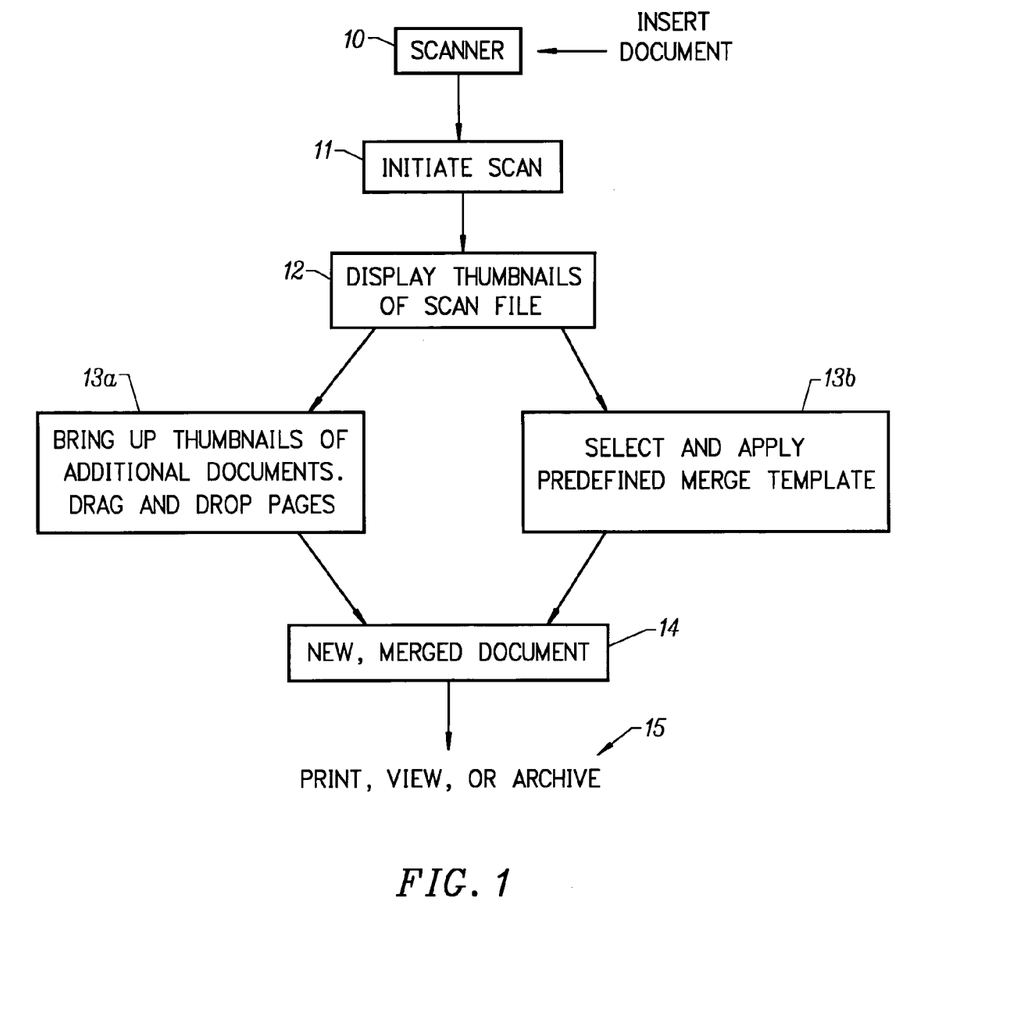
FIG. 1 provides a block diagram of a method for merging scan files with document files on a page basis, according to the invention.

Referring now to FIG. 1, a scanning device 10 is provided. As further described below, the scanner may be local to a workstation or it may be accessed over a network connection to a color print server. In a preferred embodiment of the invention, the scanning device is equipped with an automatic document feeder (ADF) to facilitate the scanning of multi-page documents. In other embodiments, the scanner may comprise the platen of a copying machine. To begin, the user places a document to be scanned in the scanning device 10, and initiates a scan 11 by executing a 'scan document' command from the GUI of a scanning software application, to be described in greater detail further below. In a preferred embodiment of the invention, the scan file is converted to a .PDF file. In other embodiments the scan file may comprise a raster data file, a bitmap file, or another page description format such as POSTSCRIPT (PS) or Page Construction Language (PCL). After the document is scanned the user directs the scan file to a job management utility. In the interface of the job management utility, thumbnail images of the separate pages of the scanned document are displayed 12. The user then retrieves another document file by selecting it from a displayed directory of document files. The pages of the second file are displayed as thumbnail images 13*a*. The second document may be another scan file or it may be an existing document file in any of the file formats previously mentioned. The user then selects pages from the two document files. In the preferred embodiment of the invention, page selection is accomplished by clicking the thumbnail image of the desired page with a mouse. However, other commonly known methods of selecting graphical objects may be substituted without departing from the spirit and scope of the invention. After the pages from each document are specified, the user then combines the pages according to a desired order by dragging and dropping the thumbnail images, until they are arranged in the desired order.

Figure 2:
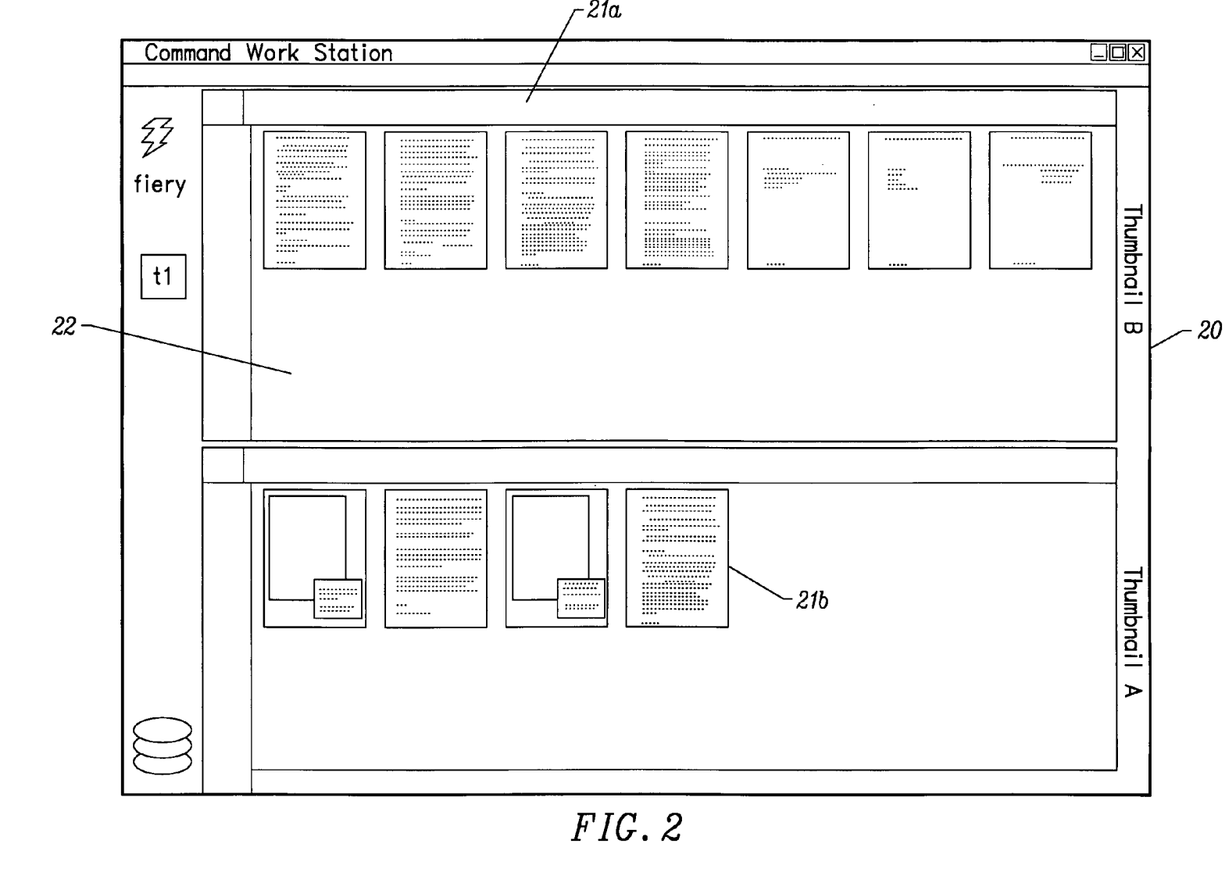
FIG. 2 illustrates a graphical user interface of a job management utility for merging document files on a page basis, according to the invention.

FIG. 2 illustrates the process of selecting and combining pages. The user interface of a job management utility includes a multi-frame window 20. The upper frame contains Thumbnail 'B', representing a document having eight pages, although the user would have to scroll to the left to see the thumbnail of page one. As indicated by the arrow 22, page four (21*a*) from thumbnail 'B' is selected and dragged to the lower frame to become page four (21*b*) in thumbnail 'A,' thus creating a new merged document 14. Subsequently, additional pages from Thumbnail 'B' may be added, and the pages may be reordered. Finally, the merged document may be previewed 15 or it may be routed directly to the print workflow without previewing. Additionally, the merged document may be archived as a new document file.

The user may elect to save the merging instructions generated during the creation of the merged document to a merge template. The resulting merge template may be selected and applied at a future time to other document files. As an alternative to dragging and dropping page thumbnails, the user may select a predefined merge template from a menu of templates 13*b*. The predefined merge templates are generated in any of several ways. They can be generated as previously described, by saving merging instructions generated during the creation of a document. Additionally, the merging instructions may be scripted, either manually or through the use of a workflow software application. Several examples of scripted merging instructions are shown below:

Where A, B and C represent source documents:

Example 1—page order=A1 A2 A3 B1 B2 B10 A9 C20 C1 C2.

Example 2—page order=A1 B1 A2 B2 A3 B3 repeat pattern until end of one document.

Example 3—page order=C1 C2 A1 B1 A2 B2 . . . A100 B100 C3 C4, etc.

Thus, a predefined page order may be applied to the selected pages in a single step, requiring a minimal amount of time and effort on the part of the user.

The merge template constitutes a valuable tool for accelerating and simplifying the printing workflow and its utility is not limited to specifying pagination in merged documents. The merge template may also incorporate instructions for imposition, the placement of multiple pages on a single sheet. For example, if the source pages were originally in an 8½"×11" format, the user may desire to print several pages on a single sheet, perhaps to publish the document in pamphlet or booklet form. The merge template may be used to include instructions for printing the document "four up," meaning four pages per sheet. The example immediately preceding is not meant to be limiting. Additionally, single-sided or duplex printing may be specified. The merge template may be used to specify any layout parameter or color setting that would be specified in the job ticket for a print job including:

Source RGB

Color profile

Source type (image, text, graphics)

Saturation

True Color

Smoothing or anti-aliasing

Toner reduction, and

Print modes.

Other applications of the merge template consistent with the spirit and scope of the invention will be apparent to those skilled in the arts of computer graphics and digital printing.

Thus, based on past print jobs that have been successful, the user is able to specify multiple parameters and settings with a single selection simply by applying a predefined merge template incorporating all of the settings of the previous job that were successfully applied.

Figure 3:
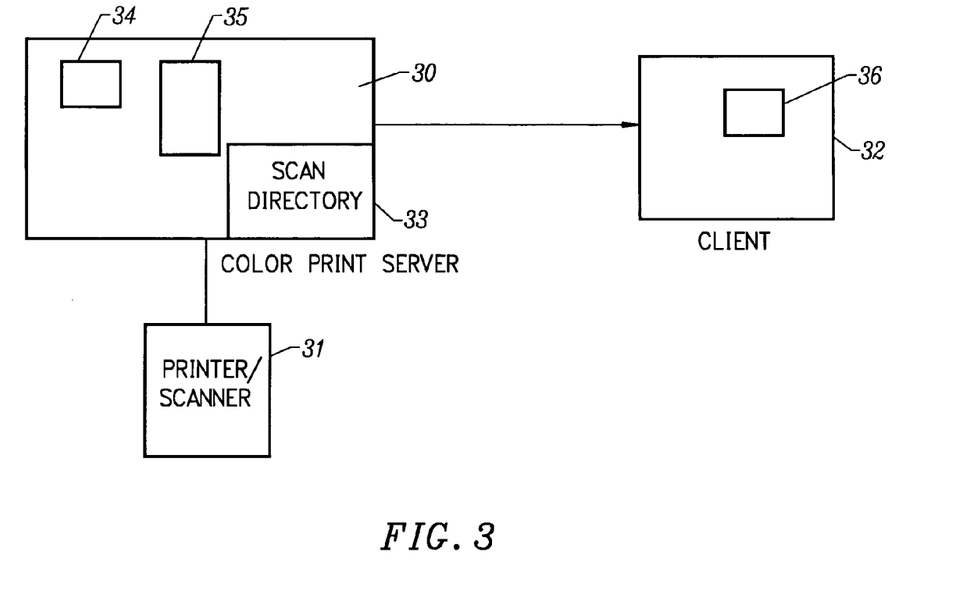
FIG. 3 provides a block diagram of a system for color scanning in a network environment, according to the invention.

As described, herein, the invention is embodied as a method and a system. Referring now to FIG. 3, a block diagram of a system for implementing the invented method is shown. A color print server 30 is provided. Resident thereon is a scanning management software module 34 for managing scanning in a network environment. Connected to the color print server is a scanning device 31. In certain embodiments of the invention the scanner is a dedicated scanner equipped with an Automatic Document feeder (ADF). The scanning device 31 may also be the platen of a color copying machine. Also resident on the color print server is a scanning software application 35 having a user interface through which the user may perform various tasks related to document scanning, including:

Source definition
Set destination
Save to network location
Export to printstream
Image modification during scanning; and
Image modification post-scan.

Figure 12:
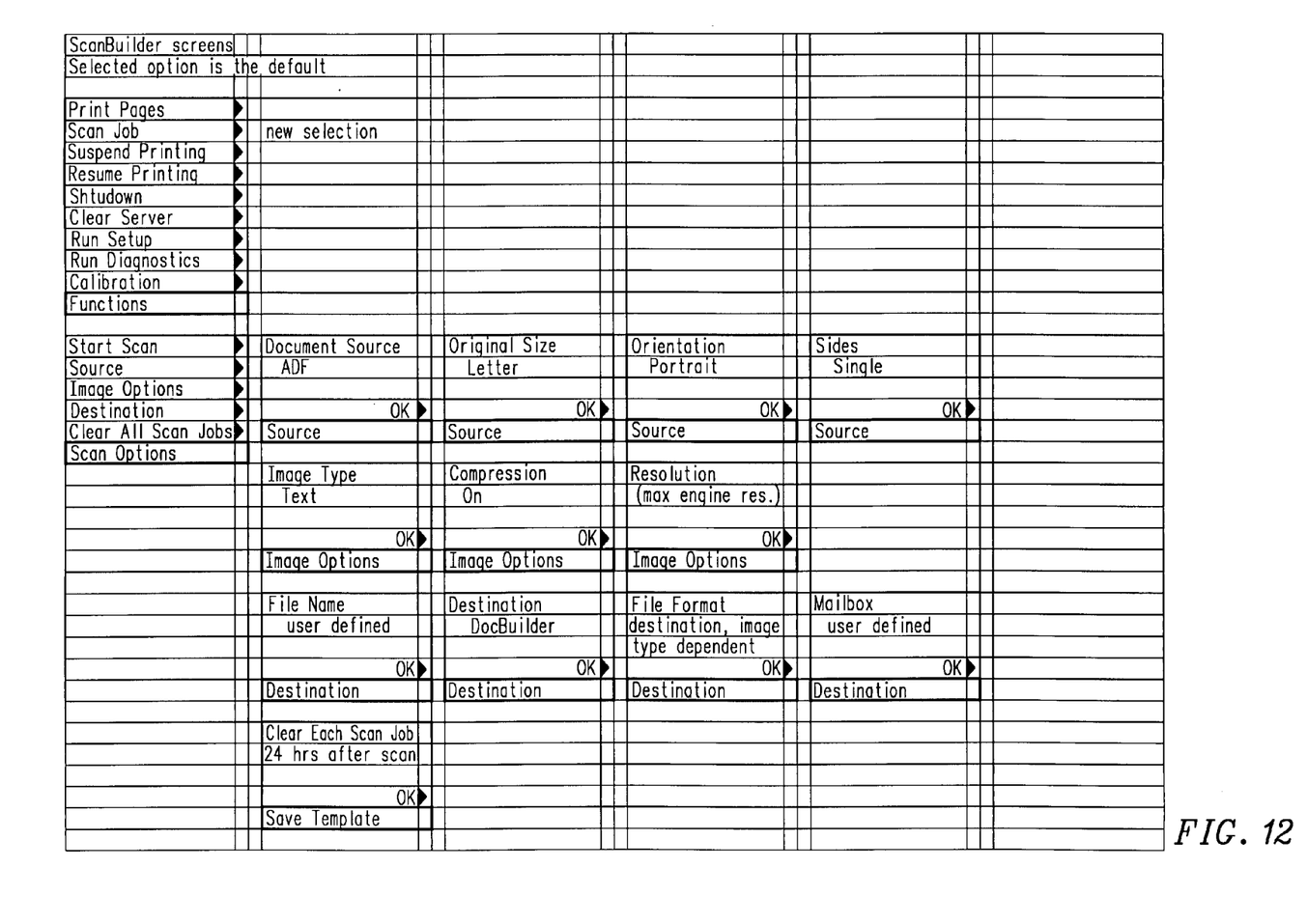
FIG. 12 shows an LCD interface for initiating and modifying scans on a color print server, according to the invention.

In one embodiment of the invention, the interface constitutes a graphical user interface (GUI) on a display device connected directly to the color print server. In an alternate embodiment, the user interface constitutes an LCD interface mounted directly on the color print server. FIG. 12 shows an exemplary LCD interface.

A client workstation 32 is in communication with the color print server 30. The job management utility 36 previously described resides on the client workstation.

Figure 6:
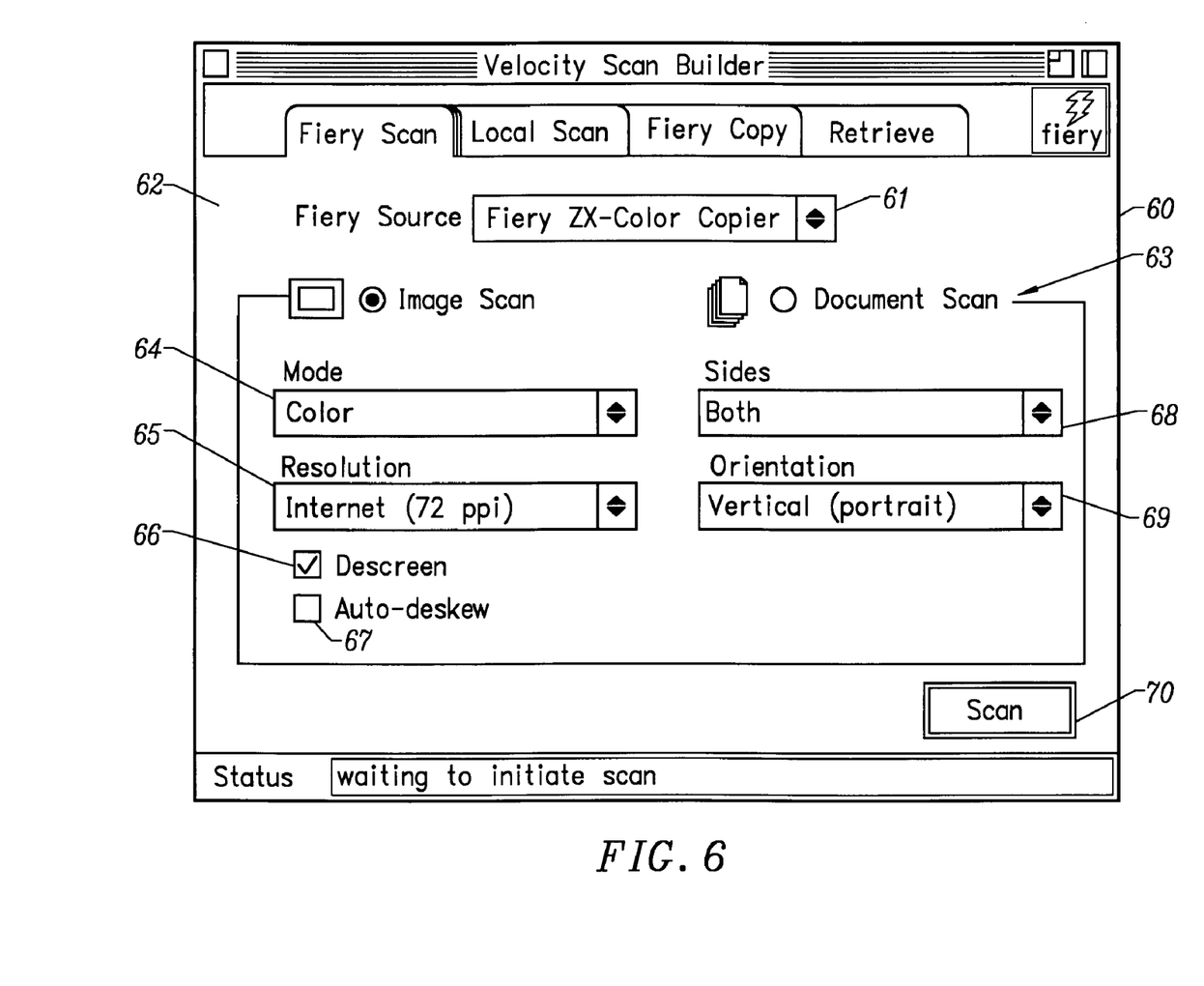
FIG. 6 shows a user interface for initiating a network scan in a scanning software application, according to the invention.

Referring to FIG. 6, shown is a dialog box 60 for initiating a scan on the color print server 30. A pull down menu 61 allows the user to specify the scan source. As previously mentioned the scanner may be either a dedicated scanner equipped with an ADF or it may be the platen of a color copier. In this case, the scan source is a color copier. Controls 62 and 63 are provided for specifying the source type, image or document. A pulldown menu 64 allows the user to specify the scan mode, the three options being:

Color
Black and white
Photograph.

Figure 7:
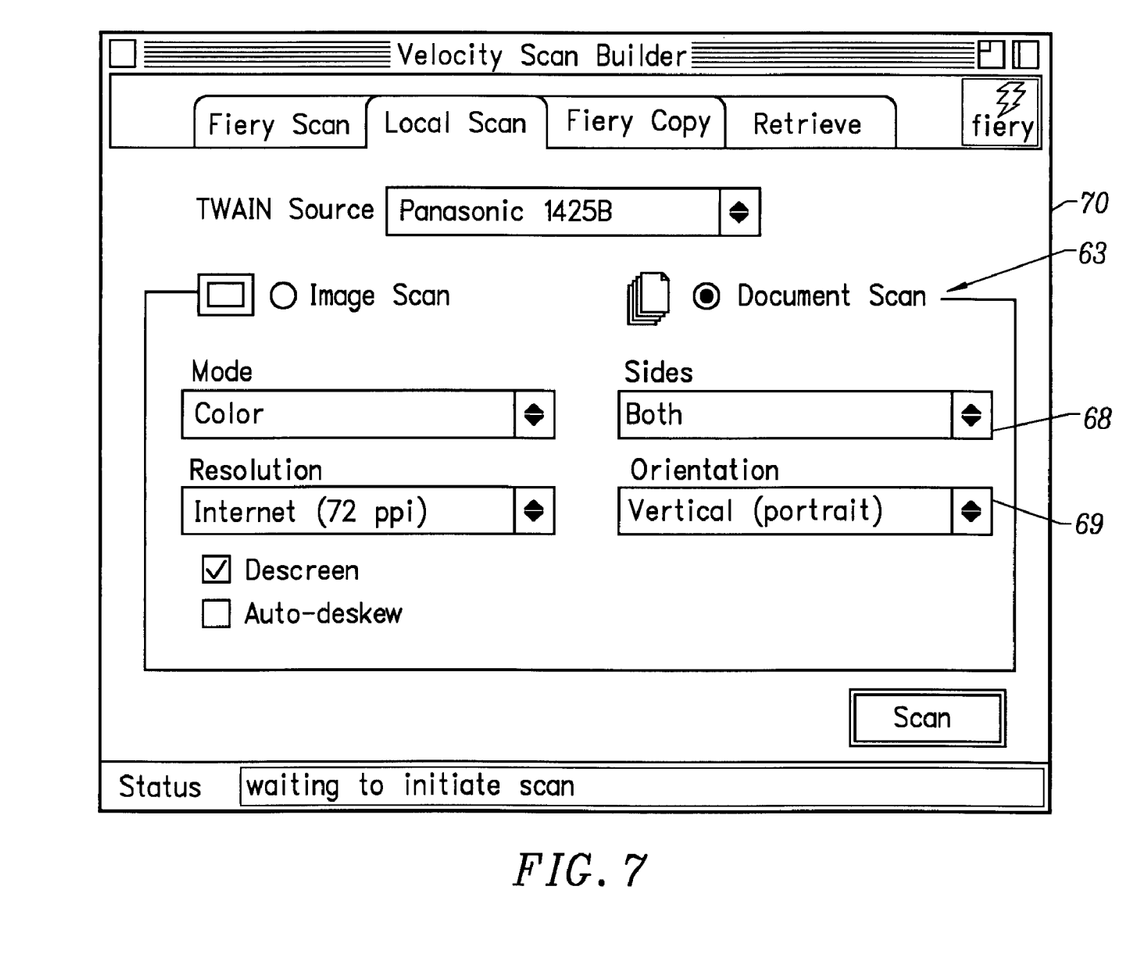
FIG. 7 shows a user interface for initiating a local scan in the scanning software application of FIG. 6, according to the invention.

A pulldown menu 65 allows the user to specify scan resolution in pixels per inch (PPI). Checkboxes 66 and 67 allow the user to select or deselect 'Descreen' and 'Autodeskew.' A pulldown menu 68 allows the user to specify the number of sides that must be scanned, with the options being 'Single' and 'Both.' However, double-sided scanning is only supported in scanners having an ADF. In the example of FIG. 6, scanning is performed from a color copier's image glass (platen) so the 'Sides' pulldown 68 is grayed-out. In FIG. 7, a scanner equipped with an ADF is selected, and therefore the 'Sides' pulldown 68 is enabled. Additionally, page orientation 69 may be specified, the options being 'Vertical (portrait)' and 'Horizontal (landscape).' Finally, the user initiates the scan by clicking the 'Scan' button 70. As the scan is being performed, the video ASIC of the scan engine may apply a compression format to the scan data, or the scan may be saved directly to the drive of the color print server in a native file format. In the case of a color image, the scan may be converted to the JPEG format, and in the case of a black & white image, the scan may be converted to the .JBIG format.

Figure 8:
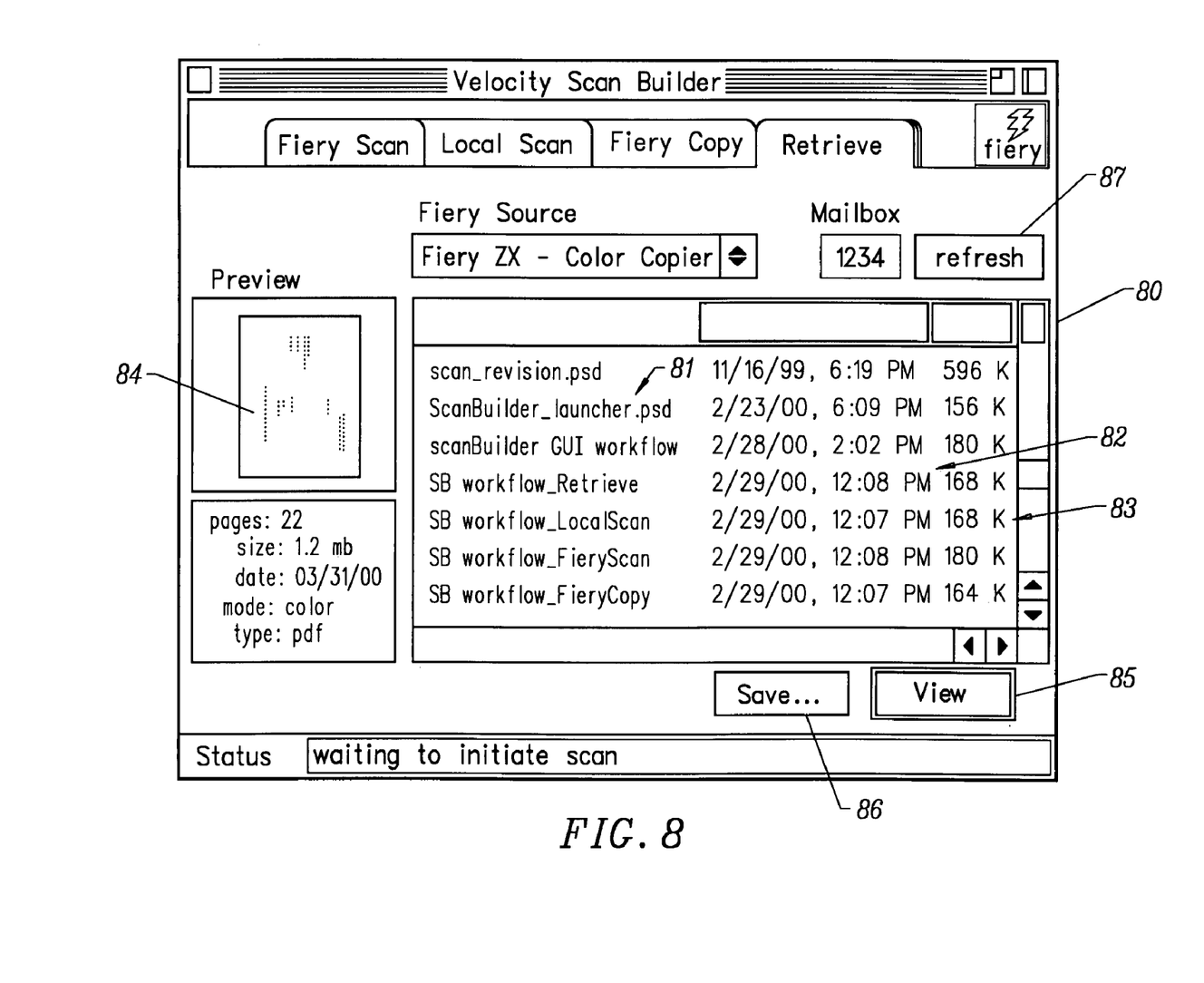
FIG. 8 shows a user interface for retrieving scan files in the scanning software application of FIG. 6, according to the invention.

When the scan is complete, the scan file is temporarily saved to a mailbox 87 carrying a numerical designator on the drive of the color print server. After a scan is saved to its temporary location, the user may further specify a final destination for the scan file. FIG. 8 shows a dialog 80 for retrieving scan files. When the scan is saved to the mailbox 87, the scanning application assigns the scan file a default file name 81 and affixes a time and date stamp 82. In addition, the file size 83 is given. Thumbnail images 84 of the scan file provide a preview capability. A 'Save' button 86 allows the user to specify another destination for the scan file according to the following options:

import into the job management utility 36—the scan application converts and stores the file as a .PDF file on the drive of the color print server, to be retrieved later by the job management utility 36 resident on the client workstation 32;

save to a network location of the user's choice in a file format specified by the user;

the scanner application will send an email notification of the file's existence with a clickable hyperlink to the file's URL on the drive of the color print server;

the scan file may be faxed to a user-specified destination; and     the scan file may be exported to the print stream.

Figure 9:
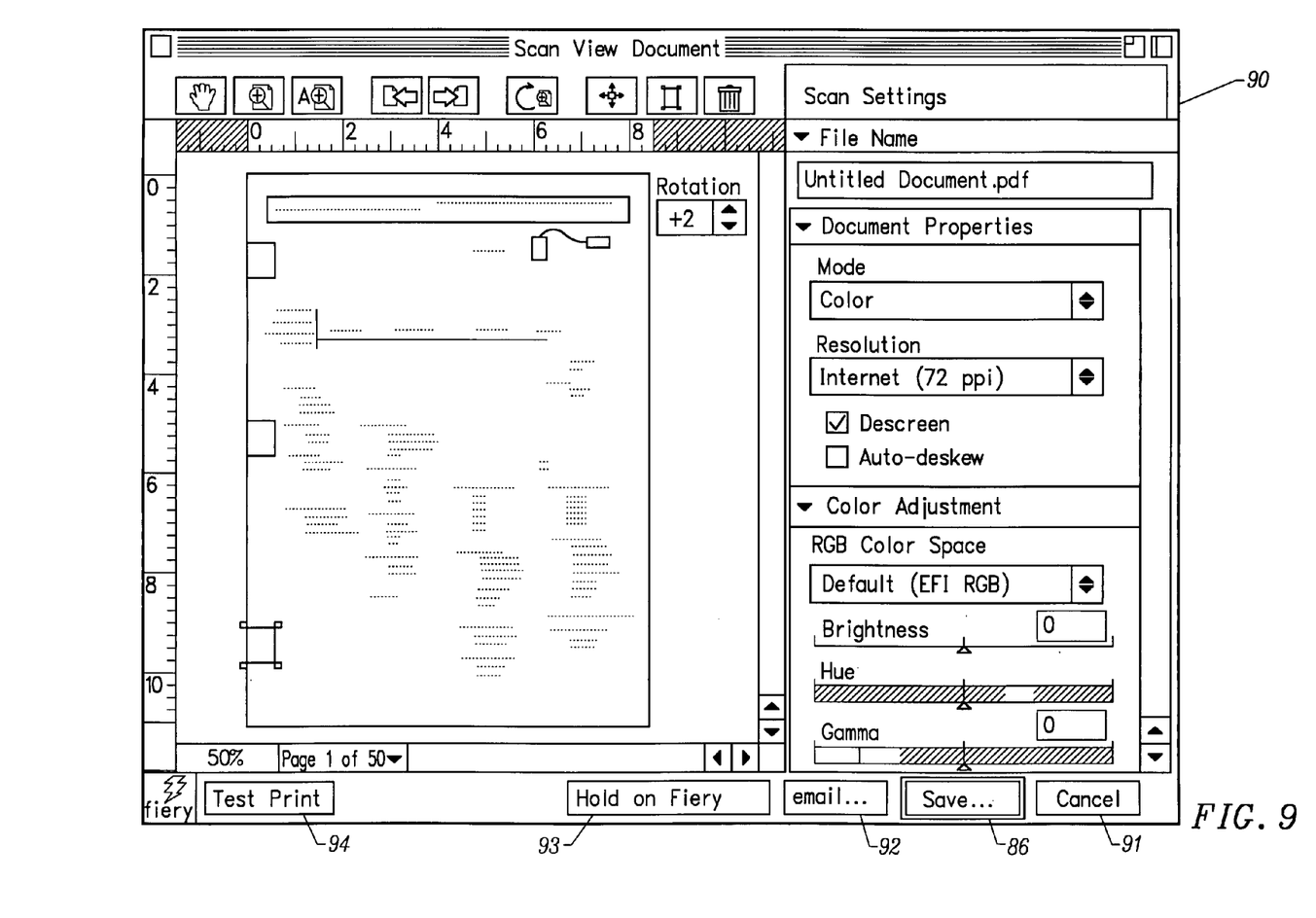
FIG. 9 shows a user interface for viewing and modifying document scans in the scanning software application of FIG. 6, according to the invention.
Figure 10:
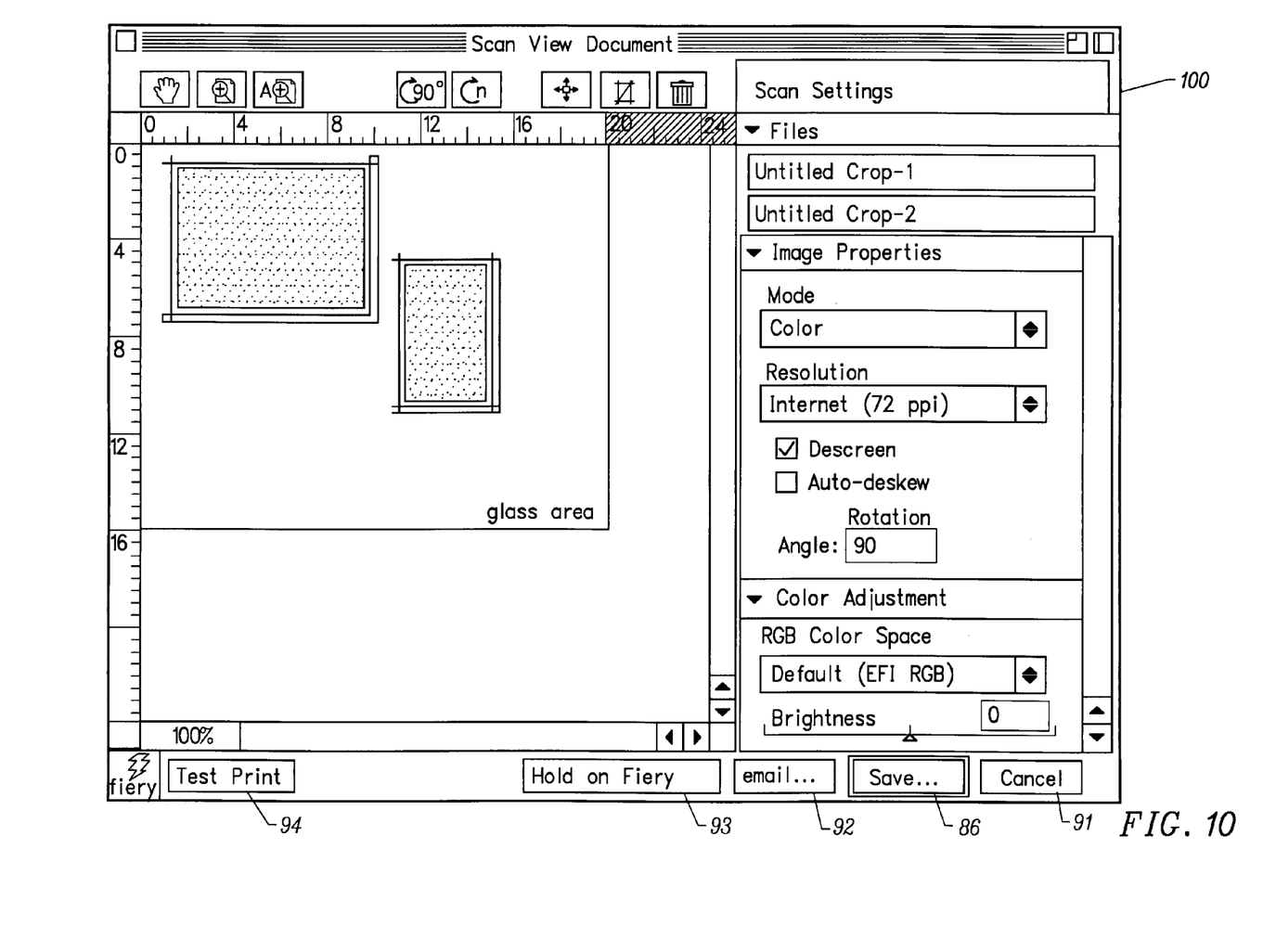
FIG. 10 shows a user interface for viewing and modifying image scans in the scanning software application of FIG. 6, according to the invention.

While the scanning application gives the scan file a default file name, the user may override this feature and assign a file name of their choice. Instead of specifying a destination for the scan file, the user may first view the file by clicking the 'View' button 85, whereupon the file is opened and displayed in a user dialog as shown in FIGS. 9 and 10. FIG. 9 shows the interface for displaying a document file and FIG. 10 shows the interface for displaying an image file. From the two dialogs 90, 100 the user is able to make a variety of modifications to the scan file. Parameters to be modified may include one or more of:

Resolution
Scan mode
Brightness
Threshold
Contrast
Scaling
Original image
Color conversion
Color profile
Rotation
Crop
Unsharp mask
Deskewing
File format; and
Compression.

After making image modifications, the user may then specify a destination, as previously described. Both dialogs 90 and 100 have controls for saving and specifying a destination 86 and canceling image modifications 91, sending e-mail notification 92 and doing a test print 94. Rather than specifying an alternate destination, the user may elect to hold the file on the color print server at its original location 93.

Figure 4:
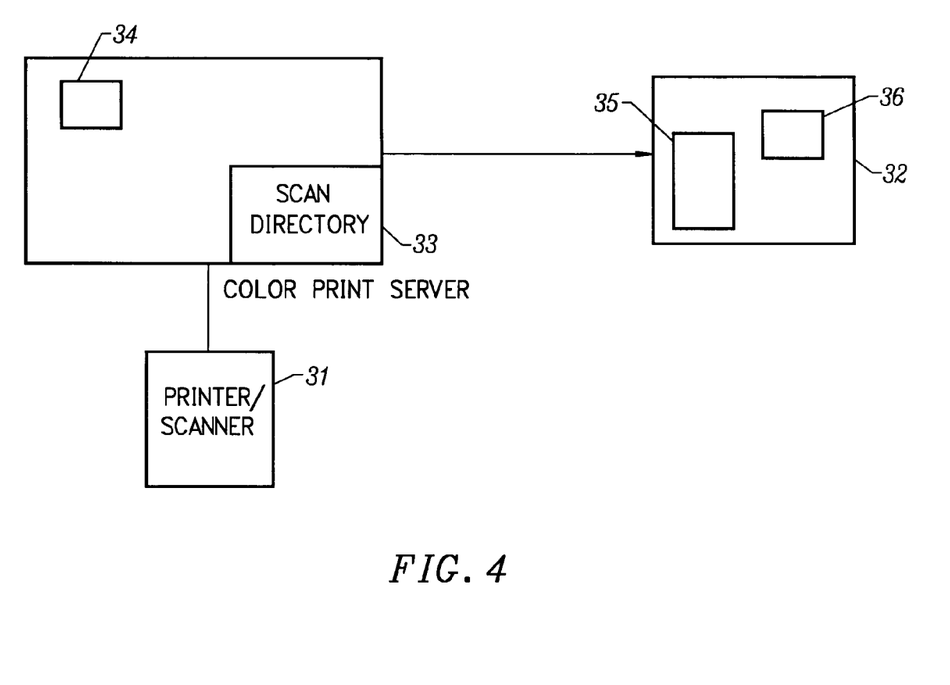
FIG. 4 provides a block diagram of an alternate architecture for the system of FIG. 3, according to the invention.

While the invention has thus far been described within the context of particular system architecture, other embodiments of the invention employing alternative system architectures are possible. For example, as shown in FIG. 4, the scanning application 35 may reside on the client workstation 32 rather than on the color print server 33. Thus, within this architecture, all user activities are initiated from the client workstation, although they are still executed on the color print server.

Figure 5:
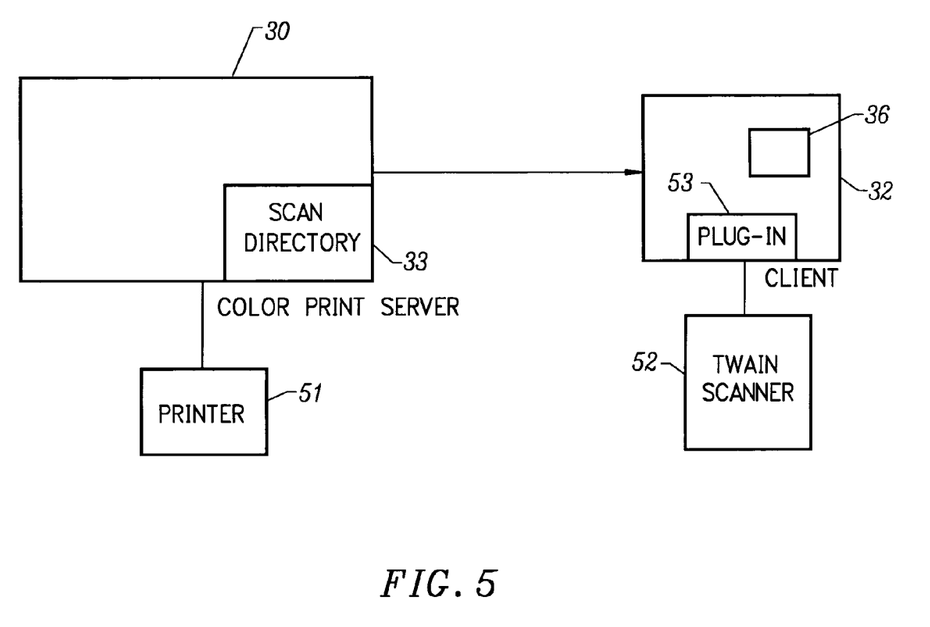
FIG. 5 provides a block diagram of a further alternate architecture for the system of FIG. 3, according to the invention.
Figure 11:
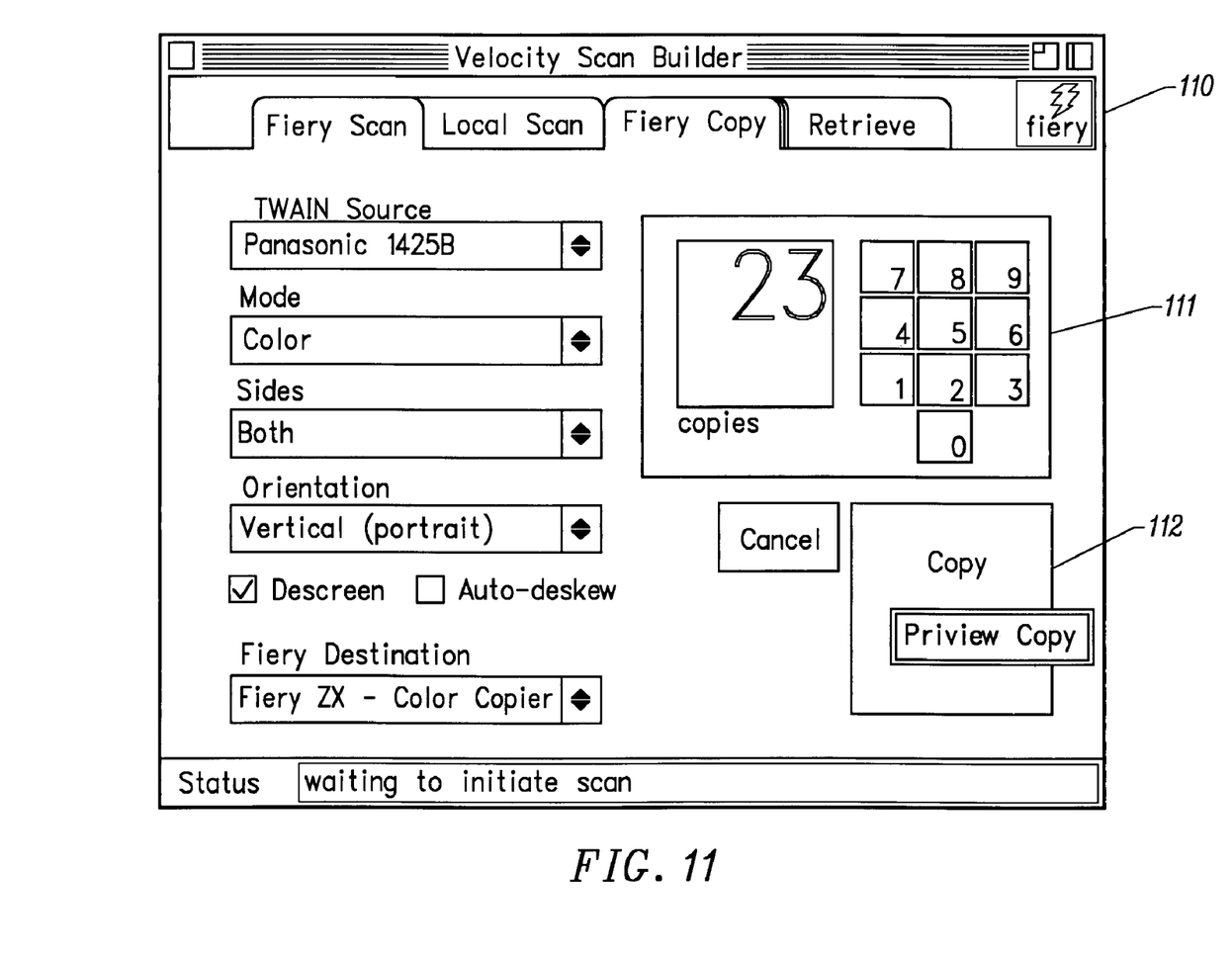
FIG. 11 shows a user interface for using a scanner and a color printer as a color copier in the scanning software application of FIG. 6, according to the invention.

In another system architecture, instead of a printer/scanner 31 connected to the color print server 30, a third party TWAIN scanner 52 is attached to the client workstation, as shown in FIG. 5. A plug-in 53 resident on the client workstation 32 works with the third party scanning software to provide most of the functionality of the original scanning software. As shown in FIG. 7, the user may specify a local TWAIN source, rather than a network scan. The TWAIN plug-in 53 and third party scanner 52 allow the color print server to be combined with an attached printer 51 to function as a color copier. As shown in FIG. 11, a dialog 110 provides interface elements 111 and 112 to emulate the control panel of a color printer.

According to a further alternate embodiment (not shown), the color printer server is embedded in a color copier, with the interface to the color print server comprising the control panel on the color copier.

Although the invention is described herein with reference to a variety of preferred embodiments, one skilled in the art will readily appreciate that other applications may be substituted for those set forth herein without departing from the spirit and scope of the present invention. Accordingly, the invention should only be limited by the claims included below.

What is claimed is:

1. A method of merging document files into a printing workflow, the method comprising:
   providing a plurality of document files, each comprising one or more pages, at least one of said document files a scan file comprising any of a scanned document file and a scanned image file, wherein said scan file is a raster data file;
   optionally, converting said scan file to any of a bitmap file and a page description language (PDL) file;
   providing at least one additional file, said additional file comprising any of another scan file and a pre-existing print file, said additional file comprising any of a raster data file, a bitmap file and a PDL file;
   displaying an image of each page of each of said document files;
   selecting at least one page from each of at least two of said document files; and
   combining said selected pages in a desired order, wherein said scanned files are merged with said document files on a page-by-page basis so that said combined pages comprise a new document file.

2. The method of claim 1, wherein the step of providing said scan file comprises the steps of:
   providing a scanning device and a color print server;
   scanning a document, wherein a user initiates and customizes a scan using a first software module; and
   storing said scan file.

3. The method of claim 2, wherein said first software module resides on said print server and includes a user interface, said user interface comprising any of a GUI connected to said server, an LCD panel mounted on said print server and a control panel on said scanning device.

4. The method of claim 2, wherein said first software module resides on said print server, said print server being embedded in a color copier, an interface to said first software module comprising a control panel to said color copier.

5. The method of claim 2, wherein said first software module resides on a client workstation in communication with said print server, said software module including a GUI.

6. The method of claim 2, wherein said scan file is stored on a mass storage device connected to said print server.

7. The method of claim 2, wherein said scan file is stored on a mass storage device connected to said workstation.

8. The method of claim 2, wherein said scan file is stored to a network location specified by said user.

9. The method of claim 2, wherein said scanner is equipped with an automatic document feeder (ADF).

10. The method of claim 2, wherein said scanner comprises any of the platen of a copying machine and a dedicated scanner.

11. The method of claim 2, wherein said scanner is connected to said print server.

12. The method of claim 2, wherein said scanner is connected to said workstation.

13. The method of claim 2, wherein said document scanning step comprises the steps of:
   specifying a scanning device;
   specifying one of image scan and document scan;
   specifying video-based image modifications to be made during said scan, said modifications including compression and color space transformations;
   specifying scan mode;
   specifying resolution;
   specifying any of single sided and duplex;
   specifying page orientation;
   specifying a destination for said scan file; and
   executing a scan document command.

14. The method of claim 13, wherein said destination specifying step comprises at least one of:
   specifying a file name for said scan file;
   specifying a PDL format for said scan file;
   specifying a network location for said scan file;
   specifying an address for email notification of said scan file's location; and
   specifying a fax destination for said scan file.

15. The method of claim 2, wherein the step of providing said scan file further comprises the step of retrieving said stored scan file from a mailbox, said scan file being temporarily stored in said mailbox.

16. The method of claim 15, further comprising the step of modifying said scan file, said modifications including:
   scan mode;
   brightness;
   threshold;
   contrast;
   scaling;
   specifying source type;
   color conversion;
   rotate;
   crop;
   unsharp mask;
   deskewing;
   file format; and
   compression format.

17. The method of claim 2, wherein said images comprise thumbnail images of said pages, and wherein said selection step comprises selecting thumbnail images corresponding to desired pages using a pointing device, wherein said thumbnail images are displayed by one of said first software module and a second software module.

18. The method of claim 17, wherein said pointing device comprises a mouse.

19. The method of claim 17, wherein said combining step comprises using said pointing device to drag said selected thumbnail images so that they are placed in a desired order, and wherein said corresponding pages are assembled in the same order.

20. The method of claim 19, further comprising the step of:
saving merging instructions generated by said combining step as a merge template, wherein said merge template is usable at a future time with another set of document files.

21. The method of claim 1, wherein said combining step comprises selecting and applying a previously created merge template, said merge template comprising instructions for combining said selected pages in a specified order.

22. The method of claim 21, said merge template further comprising at least one of:
instructions for imposing multiple pages on a single sheet;
instructions for resizing pages;
specified color choices;
specified layout options; and
specified print options.

23. The method of claim 1, wherein said combining step comprises the steps of:
providing scripted merging instructions; and
applying said scripted merging instructions;
wherein said merging instructions comprise instructions for combining pages in a specified order and at least one of:
instructions for imposing multiple pages on a single sheet;
instructions for resizing pages;
specified color choices;
specified layout options; and
specified print options.

24. The method of claim 1, wherein said combining step comprises the steps of:
creating merging instructions using a workflow application; and
applying said merging instructions;
wherein said merging instructions comprise instructions for combining pages in a specified order and at least one of:
instructions for imposing multiple pages on a single sheet;
instructions for resizing pages;
specified color choices;
specified layout options; and
specified print options.

25. The method of claim 2, wherein said page description language comprises any of POSTSCRIPT (PS), Portable Document Format (PDF) and Page Construction Language (PCL).

26. A system for merging scan files into a printing workflow comprising;
a print server;
a client workstation in communication with said print server;
a scanning device, said scanning device connected to one of said workstation and said print server;
a first software module for initiating and customizing scans, said scans performed by said scanning device to create scan files; and
a second software module for merging said scan files with document files on a page-by-page basis so that a single, merged document file is produced;
wherein:
said scan files and said document files include one or more pages;
said second software module displays images of said pages, so that a user may select at least one page from at least one scan file and at least one page from at least one document file and combine said selected pages in a desired order, said combined pages comprising a new document file;
said at least one scan file comprises a raster data file that is convertible to any of a bitmap file and a PDL file, and further comprises any of a scanned document file and a scanned image file; and
at least one additional file is provided, said additional file comprising any of another scan file and a pre-existing print file, said additional file further comprising any of a raster data file, a bitmap file and a PDL file.

27. The system of claim 26, wherein said first software module resides on said print server, and includes a user interface, said user interface comprising any of: a GUI (Graphical User Interface) connected to said print server, an LCD panel connected to said print server and a control panel on said scanning device.

28. The system of claim 26, wherein said first software module resides on said client workstation, said second software module including a GUI.

29. The system of claim 26, wherein a user initiates a scan from said first software module and stores the resulting scan file.

30. The system of claim 29, wherein said scan file is stored on a mass storage device connected to said print server.

31. The system of claim 29, wherein said scan file is stored on a mass storage device connected to said workstation.

32. The system of claim 29, wherein said scan file is stored at a network location specified by said user.

33. The system of claim 26, wherein said scanning device includes an automatic document feeder.

34. The system of claim 26, wherein said scanning device comprises any of the platen of a copying machine and a dedicated scanner.

35. The system of claim 26, wherein said scanning device is connected to said print server.

36. The system of claim 26, wherein said scanning device is connected to said workstation.

37. The system of claim 26, said means for initiating and customizing scans further comprising means for:
specifying a scanning device;
specifying one of image scan and document scan;
specifying video-based image modifications to be made during said scan, said modifications including file compression format and color space transformations;
specifying scan mode;
specifying resolution;
specifying one of single-sided and duplex;
specifying page orientation;
specifying a destination for said scan file; and
executing a scan document command.

38. The system of claim 37, wherein said means for specifying a file destination further comprises at least one of:
means for specifying a file name for said scan file;
means for specifying a mailbox for said scan file, said mailbox comprising a designation for a storage location of said scan file;
means for specifying a PDL format for said scan file;

means for specifying a network location for said file;

means for specifying an address for email notification of said scan file's location; and means for specifying a fax destination for said file.

39. The system of claim 26, said means for initiating and customizing a scan file further comprising means for retrieving and modifying said scan file, said modifications including:

scan mode;
brightness;
threshold;
contrast;
scaling;
specifying source type;
color conversion;
rotate;
crop;
unsharp mask;
deskewing;
file format; and
compression format.

40. The system of claim 26, further comprising a pointing device, said images comprising thumbnail images of said pages, wherein said user selects thumbnail images corresponding to desired pages using said pointing device.

41. The system of claim 40, wherein said pointing device comprises a mouse.

42. The system of claim 40, wherein said user combines said pages by using said pointing device to drag said selected thumbnail images so that they are placed in a desired order, and wherein said corresponding pages are assembled in the same order.

43. The system of claim 42, further comprising a merge template, said merge template comprising merging instructions generated and saved during said combining of pages.

44. The system of claim 26, further comprising at least one previously saved merge template, wherein said merge template is selected, and includes instructions for combining said selected pages in a specified order.

45. The system of claim 44, said merge template further comprising at least one of:

instructions for imposing multiple pages on a single sheet;

instructions for resizing pages;

specified color choices;

specified layout options; and specified print options.

46. The system of claim 26, wherein said page description language comprises any of POSTSCRIPT (PS), Portable Document format (PDF) and Page Construction Language (PCL).

* * * * *